(12) United States Patent
Ikai et al.

(10) Patent No.: US 9,852,153 B2
(45) Date of Patent: Dec. 26, 2017

(54) GRAPHICALLY REPRESENTING PROGRAMMING ATTRIBUTES

(71) Applicant: Ab Initio Technology LLC, Lexington, MA (US)

(72) Inventors: Taro Ikai, Tokyo (JP); Arlen Anderson, Islip (GB)

(73) Assignee: Ab Initio Technology LLC, Lexington, MA (US)

( * ) Notice: Subject to any disclaimer, the term of this patent is extended or adjusted under 35 U.S.C. 154(b) by 65 days.

(21) Appl. No.: 13/835,199

(22) Filed: Mar. 15, 2013

(65) Prior Publication Data

US 2014/0095560 A1    Apr. 3, 2014

Related U.S. Application Data

(60) Provisional application No. 61/707,343, filed on Sep. 28, 2012.

(51) Int. Cl.
  *G06F 17/30* (2006.01)
  *G06F 9/44* (2006.01)

(52) U.S. Cl.
  CPC .......... *G06F 17/30221* (2013.01); *G06F 8/34* (2013.01); *G06F 8/75* (2013.01)

(58) Field of Classification Search
  CPC ....................... G06F 17/3002; G06F 17/30067
  (Continued)

(56) References Cited

U.S. PATENT DOCUMENTS 6,003,040 A    12/1999 Mital et al.
6,725,227 B1    4/2004 Li
(Continued)

FOREIGN PATENT DOCUMENTS

CN    101084496    12/2007
EP    1258814    11/2002
(Continued)

OTHER PUBLICATIONS

DePauw, W., et al., "Web Services Navigator: Visualizing the Execution of Web Services." IBM Systems Journal, vol. 44, No. 4, 2005, pp. 821-845.
(Continued)

*Primary Examiner* — Kris Mackes
*Assistant Examiner* — Allen Lin
(74) *Attorney, Agent, or Firm* — Fish & Richardson P.C.

(57) ABSTRACT

A computing system for representing information, the computing system including at least one processor configured to process information. The processing includes defining a data structure representing a hierarchy of at least one programming attribute for developing an application. The data structure is stored in a file to allow the data structure to be used by other data structures stored in other files. The processing also includes producing a visual diagram including a graphical representation of the data structure and a graphical representation of the file storing the data structure. The visual diagram also includes a graphical representation of a relationship between the data structure and another data structure and a graphical representation of a relationship between the file storing the data structure and another file storing the other data structure. The computing system also including an output device for presenting the visual diagram that includes the graphical representations of the data structure and file and the graphical representations of the relationship of the data structures and the relationship of the files.

33 Claims, 13 Drawing Sheets

(58) Field of Classification Search
USPC .......................................................... 707/829
See application file for complete search history.

(56) References Cited

U.S. PATENT DOCUMENTS

| | | | |
|---|---|---|---|
| 7,401,064 | B1 | 7/2008 | Arone |
| 7,456,840 | B2 | 11/2008 | Molesky et al. |
| 7,493,570 | B2 | 2/2009 | Bobbin |
| 7,546,226 | B1 | 6/2009 | Yeh et al. |
| 7,590,672 | B2 | 9/2009 | Slik et al. |
| 7,725,433 | B1 | 5/2010 | Labrie |
| 7,844,582 | B1 | 11/2010 | Arbilla et al. |
| 7,970,240 | B1 | 6/2011 | Chao et al. |
| 8,266,122 | B1 | 9/2012 | Newcombe et al. |
| 8,332,782 | B1 | 12/2012 | Chang et al. |
| 8,577,852 | B2 | 11/2013 | Haahenson et al. |
| 8,654,125 | B2 | 2/2014 | Gibson |
| 8,819,010 | B2 | 8/2014 | Fankhauser |
| 2002/0030703 | A1* | 3/2002 | Robertson et al. ............ 345/853 |
| 2004/0181554 | A1 | 9/2004 | Heckerman et al. |
| 2004/0255239 | A1 | 12/2004 | Bhatt |
| 2005/0246352 | A1 | 11/2005 | Moore et al. |
| 2006/0095466 | A1 | 5/2006 | Stevens et al. |
| 2006/0106847 | A1 | 5/2006 | Eckardt et al. |
| 2006/0190844 | A1* | 8/2006 | Binder et al. ................. 715/853 |
| 2006/0218159 | A1 | 9/2006 | Murphy et al. |
| 2006/0271505 | A1 | 11/2006 | Vierich et al. |
| 2006/0294150 | A1 | 12/2006 | Stanfill et al. |
| 2007/0016624 | A1 | 1/2007 | Powers |
| 2007/0033220 | A1 | 2/2007 | Drucker et al. |
| 2007/0061287 | A1 | 3/2007 | Le et al. |
| 2007/0061353 | A1 | 3/2007 | Bobbin |
| 2007/0112875 | A1 | 5/2007 | Yagawa |
| 2007/0150496 | A1 | 6/2007 | Feinsmith |
| 2007/0255741 | A1 | 11/2007 | Geiger et al. |
| 2008/0163124 | A1 | 7/2008 | Bonev et al. |
| 2008/0172629 | A1 | 7/2008 | Tien et al. |
| 2008/0183658 | A1 | 7/2008 | Mangipudi |
| 2009/0012983 | A1 | 1/2009 | Senneville et al. |
| 2009/0216728 | A1 | 8/2009 | Brainerd et al. |
| 2010/0138431 | A1* | 6/2010 | Bator et al. ................... 707/755 |
| 2010/0223430 | A1 | 9/2010 | Walker et al. |
| 2011/0320460 | A1 | 12/2011 | Fankhauser |
| 2012/0059857 | A1* | 3/2012 | Jackson, Jr. .................. 707/797 |
| 2012/0209656 | A1 | 8/2012 | Rojahn |
| 2012/0254805 | A1 | 10/2012 | Pic et al. |
| 2012/0310875 | A1 | 12/2012 | Prahlad et al. |
| 2013/0332423 | A1 | 12/2013 | Puri |
| 2014/0019423 | A1 | 1/2014 | Liensberger |
| 2014/0114907 | A1 | 4/2014 | Kozina |
| 2016/0063106 | A1* | 3/2016 | Chai ................ G06F 17/30958 707/722 |

FOREIGN PATENT DOCUMENTS

| | | |
|---|---|---|
| EP | 1510937 | 3/2005 |
| JP | 08-033895 | 2/1996 |
| JP | 11-307412 | 11/1999 |
| JP | 2002-288403 | 10/2002 |
| JP | 2005-122703 | 5/2005 |
| JP | 2008-134705 | 6/2008 |
| JP | 2008524671 | 7/2008 |
| WO | WO01/82068 | 11/2001 |
| WO | WO01/82072 | 11/2001 |
| WO | WO2005086906 | 9/2005 |
| WO | WO2007002647 | 1/2007 |
| WO | 2010/065623 | 6/2010 |

OTHER PUBLICATIONS

International Search Report & Written Opinion issued in PCT application No. PCT/US09/66390, dated Jan. 20, 2010, 7 pages.
International Search Report & Written Opinion issued in PCT application No. PCT/US09/66394, dated Jan. 20, 2010, 6 pages.
Karr, Alan, et al., "Data quality: A Statistical Perspective," Statistical Methodology 3 (2006), pp. 137-173.
Notification of Transmittal of the International Search Report and the Written Opinion of the International Searching Authority, or the Declaration, for Application No. PCT/US09/47735, dated Jul. 23, 2009, 6 pages.
Nelson, Theodor Holm, "A Cosmology for a Different Computer Universe: Data Model, Mechanisms, Virtual Machine and Visualization Infrastructure," Journal of Digital Information, vol. 5, No. 1, 22 pages (2004).
Robertson, George G. "From Hierarchies to Polyarchies: Visualizing Multiple Relationships," *Advanced Visual Interfaces* 2000.
Robertson et al., "Polyarchy Visualization: Visualizing Multiple Intersecting Hierarchies," *Computer Human Interaction—CHI*, pp. 423-430, 2002.
Supplementary European Search Report, EP 09831042, dated May 4, 2012, 8 pages.
Supplementary European Search Report, EP 09831039, dated May 15, 2012, 9 pages.
Supplementary European Search Report, EP 09767701, dated Sep. 25, 2012, 7 pages.
International Search Report & Written Opinion, PCT/US2013/076407, dated Jun. 18, 2014, 8 pages.
International Search Report & Written Opinion, PCT/US2013/062369, dated Feb. 28, 2014, 10 pages.
Japanese Office Action (with English translation), Application No. 2011-539652, dated Nov. 11, 2014.
International Preliminary Report on Patentability, PCT/US2013/062369, dated Apr. 9, 2015.
Korean Office Action issued in Application No. 10-2011-7013820, dated Oct. 21, 2015, 6 pages.
Korean Office Action issued in Application No. 10-2011-7014656, dated Oct. 21, 2015, 7 pages.
Takahashi, Kenji, "An Analysis of Requirements Elicitation Process," IEICE Technical Report, Institute of Electronics, Information and Communication Engineers, vol. 92, No. 128, 47:54 (1992).
Japanese Office Action (with English translation), Application No. 2014-232962, dated Nov. 13, 2015.
Australian Office Action in 2009-322441, dated Dec. 16, 2015, 4 pages.
Parker et al., Visualization of Large Nested Graphs in 3D: Navigation and Interaction, University of New Brunswick, Jul. 18, 2000 http://com.unh.edu/vislab/PDFs/visualnav.pdf.
Korean Office Action in Application No. 10-2015-7007990, dated Dec. 17, 2015, 6 pages.
Canadian Office Action in Application No. 2744240, dated Jan. 18, 2016, 4 pages.
Australian Office Action in 2009-0322437, dated Mar. 17, 2016, 5 pages.
Canadian Office Action in Application No. 2744463, dated Jan. 28, 2016, 4 pages.
International Search Report and Written Opinion in PCT/US14/26133, dated Aug. 21, 2014 (9 pages).
Supplementary European Search Report in EP14768183 dated Oct. 4, 2016 (5 pages).

* cited by examiner

GRAPHICALLY REPRESENTING PROGRAMMING ATTRIBUTES

CLAIM OF PRIORITY

This application claims priority under 35 USC §119(e) to U.S. Patent Application Ser. No. 61/707,343, filed on Sep. 28, 2012, the entire contents of which are hereby incorporated by reference.

BACKGROUND

This description relates to a graph based approach to representing programming attributes.

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows. A system that implements such graph-based computations is described in U.S. Pat. No. 5,966,072, EXECUTING COMPUTATIONS EXPRESSED AS GRAPHS. Various types of data may be received, processed and output by the components of the graph. Due to similar processing functionality, equivalent types of data may be used and re-used for different applications.

SUMMARY

In one aspect, a method for representing information includes defining a data structure representing a hierarchy of at least one programming attribute for developing an application. The data structure is stored in a file to allow the data structure to be used by other data structures stored in other files. The method also includes producing a visual diagram including a graphical representation of the data structure and a graphical representation of the file storing the data structure. The visual diagram also includes a graphical representation of a relationship between the data structure and another data structure and a graphical representation of a relationship between the file storing the data structure and another file storing the other data structure.

In another aspect, a computer-readable storage medium stores a computer program for representing information. The computer program includes instructions for causing a computing system to define a data structure representing a hierarchy of at least one programming attribute for developing an application. The data structure is stored in a file to allow the data structure to be used by other data structures stored in other files. The instructions also cause the computing system to produce a visual diagram including a graphical representation of the data structure and a graphical representation of the file storing the data structure. The visual diagram also includes a graphical representation of a relationship between the data structure and another data structure and a graphical representation of a relationship between the file storing the data structure and another file storing the other data structure.

In another aspect, a computing system for representing information includes at least one processor configured to process information. The processing including defining a data structure representing a hierarchy of at least one programming attribute for developing an application. The data structure is stored in a file to allow the data structure to be used by other data structures stored in other files. The processing also including producing a visual diagram including a graphical representation of the data structure and a graphical representation of the file storing the data structure. The visual diagram also includes a graphical representation of a relationship between the data structure and another data structure and a graphical representation of a relationship between the file storing the data structure and another file storing the other data structure. The computer system also includes an output device for presenting the visual diagram that includes the graphical representations of the data structure and the file and the graphical representations of the relationship of the data structures and the relationship of the files.

In another aspect, a computing system for representing information includes means for processing that include defining a data structure representing a hierarchy of at least one programming attribute for developing an application. The data structure is stored in a file to allow the data structure to be used by other data structures stored in other files. The processing also includes producing a visual diagram including a graphical representation of the data structure and a graphical representation of the file storing the data structure. The visual diagram also includes a graphical representation of a relationship between the data structure and another data structure and a graphical representation of a relationship between the file storing the data structure and another file storing the other data structure. The computer system also includes means for presenting the visual diagram that includes the graphical representations of the data structure and the file and the graphical representations of the relationship of the data structures and the relationship of the files.

Implementations may include any or all of the following features. The graphical representation of the files may be removable to allow for manipulating the graphical representations of the data structure to define one or more data structure groups and to create one or more new files for storing the one or more data structure groups. The defined data structure may be manipulated to adjust the at least one programming attribute. The defined data structure may be manipulated for inserting the at least one programming attribute into a file. A statement may be inserted at the at least one programming attribute into the file. Manipulating the data structure may include a drag and drop operation. Manipulating the defined data structure may include at least one of adding, deleting and editing content of the hierarchy of the programming attribute. The programming attribute may be a named data type, a function, etc. The relationship between the data structure and the other data structure may represent lineage of the programming attribute.

Aspects can include one or more of the following advantages.

Graphically representing programming attributes (e.g., fields, named data type structures, functions, etc.) allows a developer to relatively quickly ascertain attribute details (e.g., data types being used) and relationships among attributes (e.g., a named data type structure using previously defined fields) and files used to store the attributes. Presented in graphical form, attributes, files storing the attributes, etc. may be efficiently manipulated, for example, to edit named data type structures and thereby allow the changes to propagate as needed.

Other features and advantages of the invention will become apparent from the following description, and from the claims.

DESCRIPTION

Figure 1:
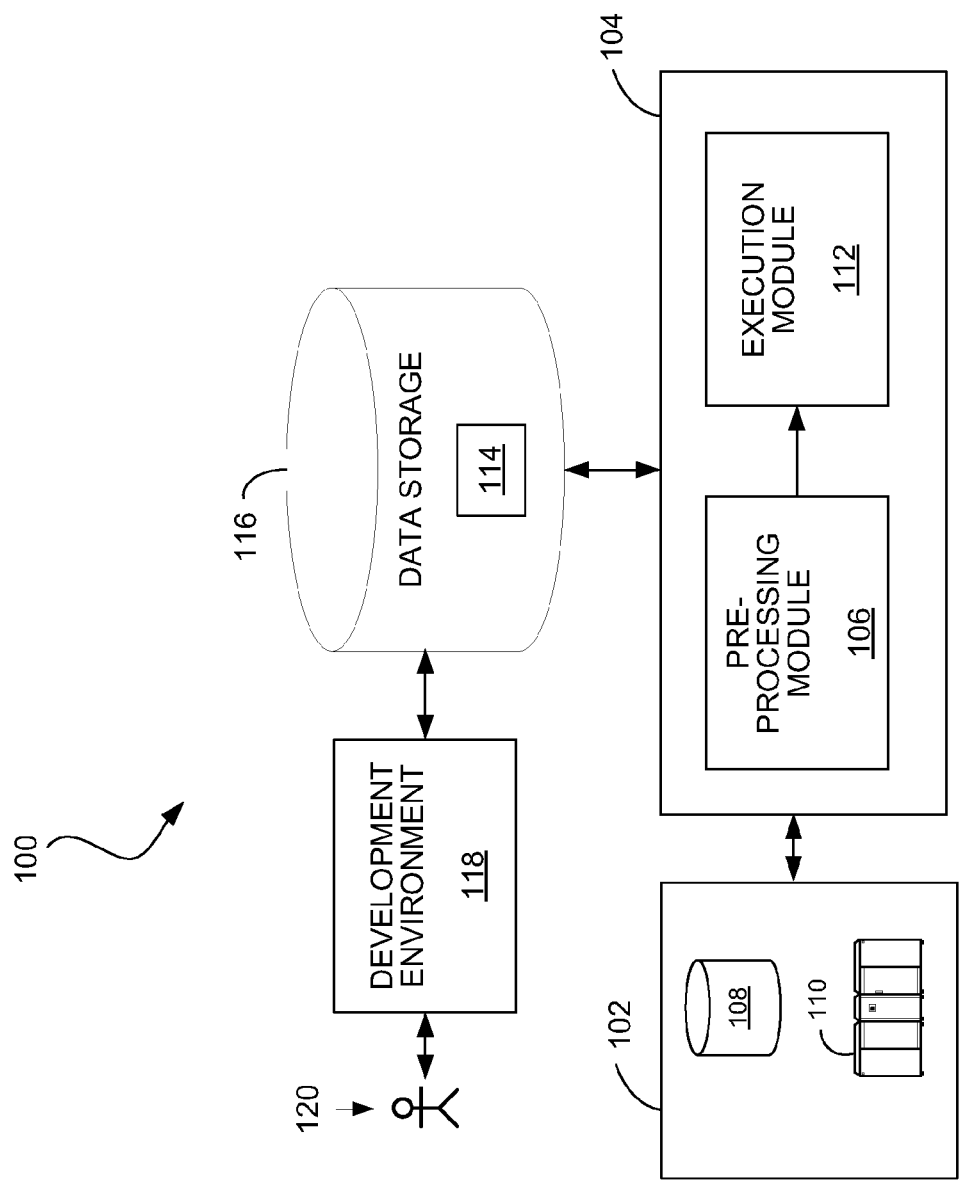
FIG. 1 is a block diagram of a system for executing graph-based computations.

FIG. 1 shows an exemplary data processing system 100 in which programming attributes such as data types, executable functions, etc. may be graphically presented, for example, to allow a casual viewer to efficiently determine the content, hierarchy and lineage of the attributes. In general, to provide such functionality, the system 100 includes a data source 102 that may include one or more sources of data such as storage devices or connections to online data streams, each of which may store data in any of a variety of storage formats (e.g., database tables, spreadsheet files, flat text files, or a native format used by a mainframe). In this example, an execution environment 104 includes a pre-processing module 106 and an execution module 112. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The pre-processing module 106 reads data from the data source 102 and performs corresponding processing operations, e.g., in anticipation of further proceeding by other modules. Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The execution module 112 uses the processed data generated by the pre-processing module 106, for example, to process the data 114 (e.g., enterprise data, company records, etc.) stored in a data storage system 116 accessible to the execution environment 104. The data storage system 116 is also accessible to a development environment 118 in which a developer 120 is able to review, edit, etc. the information stored in the data storage system 116. In some arrangements, the development environment 118 may be utilized in preparing and adjusting the execution environment 104 for performing the desired operations. For example, the development environment 118 may be a system for developing applications as dataflow graphs that include vertices (representing components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference. A system for executing such graph-based computations is described in U.S. Pat. No. 5,966,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

The pre-processing module 106 can receive data from a variety of types of systems including different forms of database systems. The data may be organized as records having values for respective fields (also called "attributes" or "columns"), including possibly null values. When first reading data from a data source, the pre-processing module 106 typically starts with some initial format information about records in that data source. In some circumstances, the record structure of the data source may not be known initially and may instead be determined after analysis of the data source. The initial information about records can include the number of bits that represent a distinct value, the order of fields within a record, and the type of data (e.g., string, signed/unsigned integer) represented by the bits.

Similar to being used in a record, different data types (e.g., strings, integers, flowing point values) can be used for processing data (e.g., records) performed by the execution environment 104, the development environment 118, etc. For example, various types of data types may be defined and used for processing records (e.g., employee records, student records, etc.). To process such records, individual primitive data types (e.g., strings, date, datetime, integer, decimal, etc.) may be used in concert to define an organization of data types, referred to as a data type structure. For example, the following record groups four primitive types to represent attributes of a person:

```
record
    string(",") surname;
    string(",") given_name;
    date("YYYY-MM-DD") date_of_birth;
    integer(1) gender; // 0 for male, 1 for female
    decimal(9) SSN;
end
```

Figure 2:
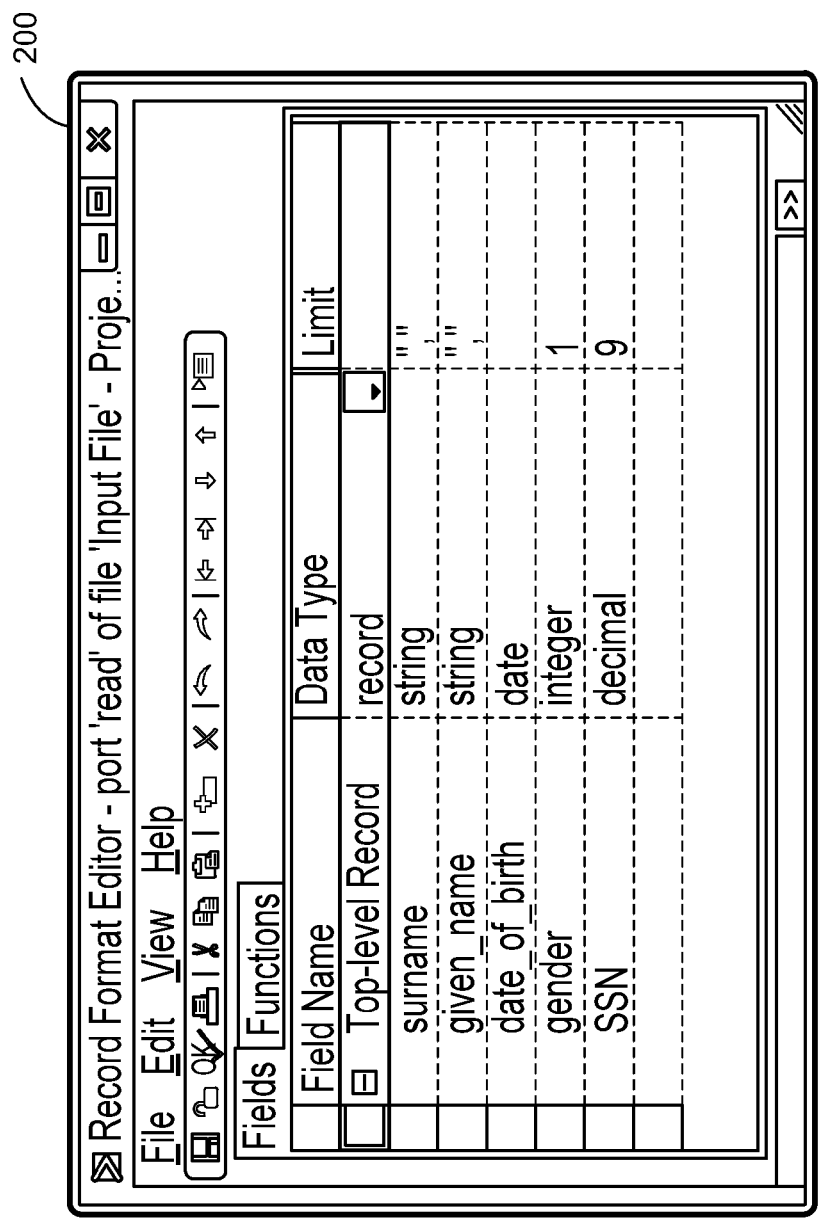
FIGS. 2-6 are user interfaces presenting data type information.

The record includes a number of fields (e.g., the first and last name of the individual is represented along with their date of birth, gender and social security number), and each field consists of a name and a data type. Referring to FIG. 2, such a record may be defined by an editor. In this example, a user interface 200 presents an editor for defining the format of data being read from an input file. Along with defining the data being read (e.g., surname, date of birth, gender), the individual data types (e.g., string, date, integer) and limitations for each field are defined. While this example presents the record type as including five distinct entries of information, the record type may be expanded or contracted. For example, more data may be appended, deleted, combined, etc. with current data. Continuing from the instructions above, a record type may be nested, for example, to express a business entity and a list of corresponding employees:

```
/* Business entity */
record
    string(",") business_name;
    decimal(9) tax_payer_id;
    decimal(11) main_TEL_no;
    record
        record
            string(",") last; // last name
            string(",") first; // first name
        end name; // subrecord
        record
            date("YYYY-MM-DD") date_of_birth;
            integer(1) gender; // 0 for male, 1 for female
        end bio; // subrecord
        decimal(9) SSN;
    end[integer(4)] employees; // vector of employees
end
```

Figure 3:
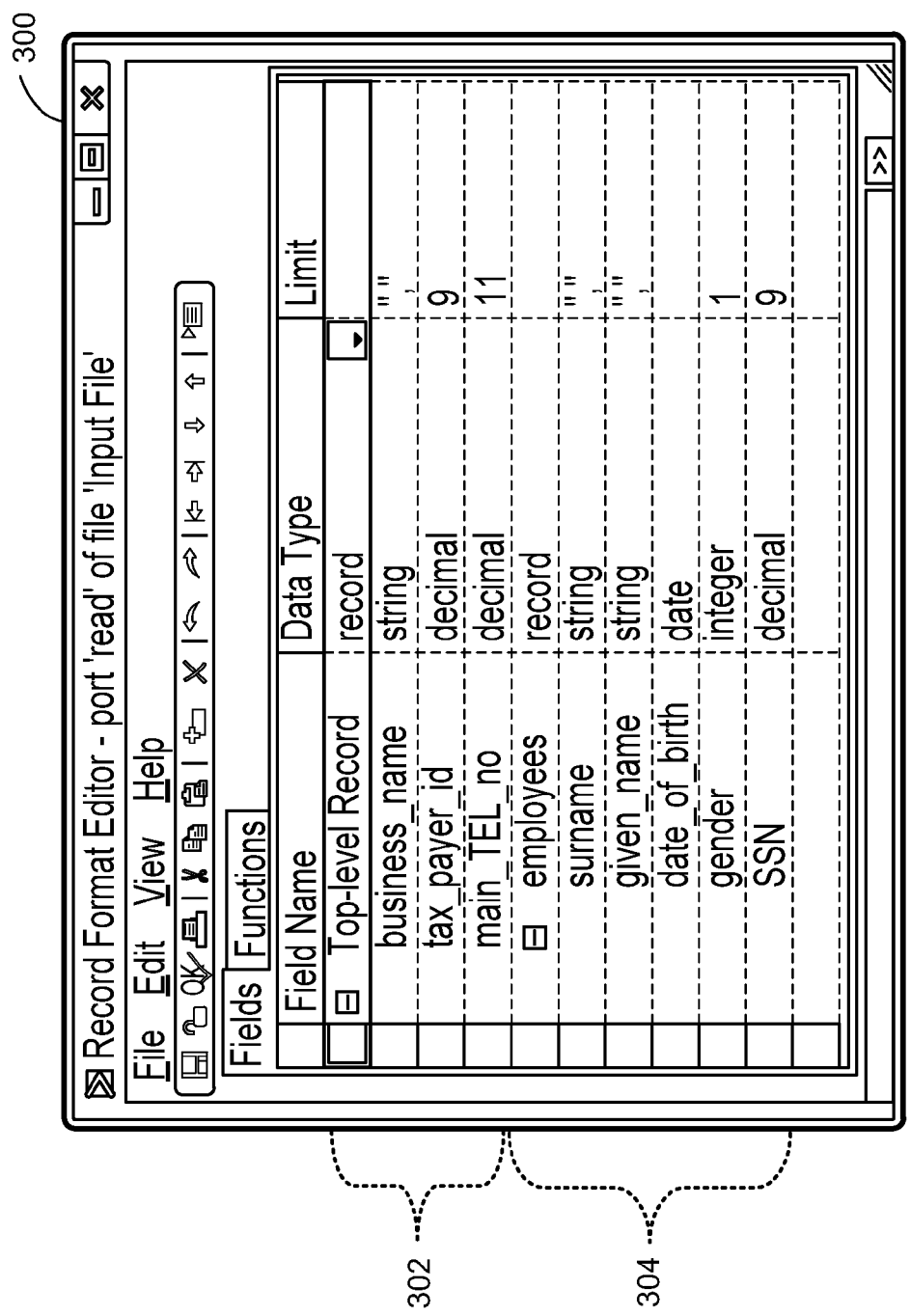

Through creating and naming data type structures, equivalent fields, etc. may be used for more than one application (e.g., to represent student information, ordering information for employees of a number of companies, etc.). Referring to FIG. 3, a user interface 300 may be implemented for presenting a data type structure that includes nested data type information. In this arrangement, fields associated with a company are defined in an upper portion (as represented by a bracket 302) and fields for the employee information are defined in a lower portion (as represented by bracket 304). As can be imagined, data type structures may be defined for a large variety of applications and many similar fields may be used and re-used (e.g., to define a record for student information, a record for employee information, etc.).

Figure 4:
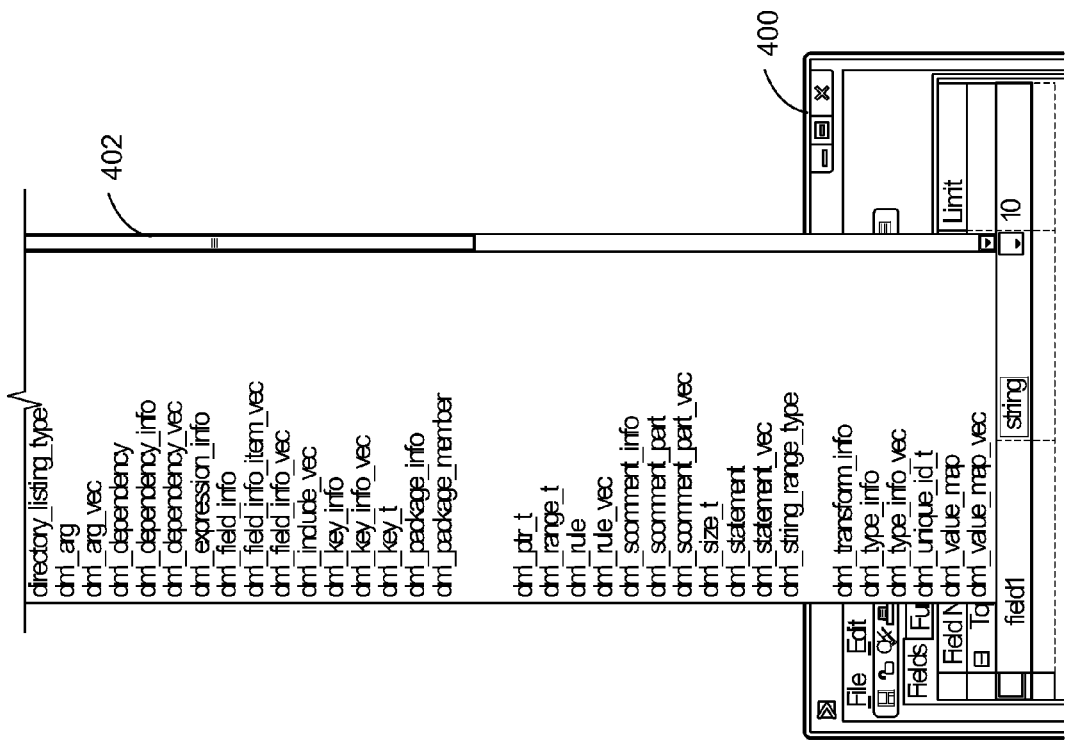

Referring to FIG. 4, one or more techniques may be implemented to assist a developer with appropriately defining fields and grouping the fields to form data type structures for use, e.g., in application development. For example, by interacting with a user interface 400 (e.g., selecting a field with a pointing device), a drop-down menu 402 may appear and present a listing of named data type structures that may be potentially selected (by the developer) for use in an application. As represented in the drop-down menu 402, as more and more named data type structures are defined, the presented listing may become onerously large and difficult for a user to navigate to identify a named data type structure of interest. For example, along with frequently selected named data type structures, the listing may grow over time to include a large number of less-frequently-used named data type structures that are unique to specific applications. As illustrated in the figure, the sheer number of entries in the menu 402 could drastically affect a developer's efficiency and may even discourage use of the user interface 400. Further, only being assigned names and lacking any other information (as shown in the entries of the menu 402) many named data type structures may be redundant and provide no information regarding relationships (if any) among other named data type structures.

One or more techniques and methodologies may be implemented to provide more manageable representations of data type structures. In one example, data type structures used in multiple, different applications may be commonly defined. From the example above, the data type structure for each student is equivalent to the data type structure of each business employee and can be commonly defined as:

```
record
    record
        string(",") last; // last name
        string(",") first; // first name
    end name; // subrecord
    record
        date("YYYY-MM-DD") date_of_birth;
        integer(1) gender; // 0 for male, 1 for female
    end bio; // subrecord
    decimal(9) SSN;
end
```

By naming this common data type structure (e.g., "person_t"), the named data type structure can be called out and used in applications for similar purposes such as collecting information for student and employee applications. For example, the named data type structure ("person_t") may be defined as:

```
type person_t =
record
    record
        string(",") last; // last name
        string(",") first; // first name
    end name; // subrecord
    record
        date("YYYY-MM-DD") date_of_birth;
        integer(1) gender; // 0 for male, 1 for female
    end bio; // subrecord
    decimal(9) SSN;
end;
```

Once defined, the named data type structure ("person_t") can be used to respectively define a data type structure for the business employee and classroom student applications:

```
/* Business entity */
record
    string(",") business_name;
    decimal(9) tax_payer_id;
    decimal(11) main_TEL;
    person_t[integer(4)] employees; // here
end
/* Classroom */
record
    string(",") home_room_instructor;
    decimal(2) grade;
    person_t[integer(4)] students; // and here
end;
```

Similarly, the new data type structures may be named for use in multiple applications. For example, a named data type structure (titled "business_t") that uses the named data type structure "person_t" may be defined for storing business information:

```
type business_t =
record
    string(",") business_name;
    decimal(9) tax_payer_id;
    decimal(11) main_TEL;
    person_t[integer(4)] employees; // vector of employees
end;
```

Similarly, a named data type structure (named "class_t") that uses the named data type structure "person_t" may be defined for storing class information:

```
type class_t =
record
    string(",") home_room_instructor;
    decimal(2) grade;
    person_t[integer(4)] students; // vector of students
end;
```

Various advantages may be provided from using a common data type structure to define multiple other data type structures. For example, rather than needing to individually adjust the two data type structures (to adjust an included data type structure), the commonly used named data type structure may be redefined once. Correspondingly, by adjusting the named data type structure, any changes would be reflected in both of the data type structures (and any other data type structures that use the named data type structure). Thereby, efficiency may be improved by allowing developers to adjust a single instance of a named data type structure being used in multiple data structures. However, developers should remain alert to such propagating adjustments (e.g., when the developer is interested in only adjusting an included data type structure in less than all of the data type structures that use the included data type structure).

Figure 5:
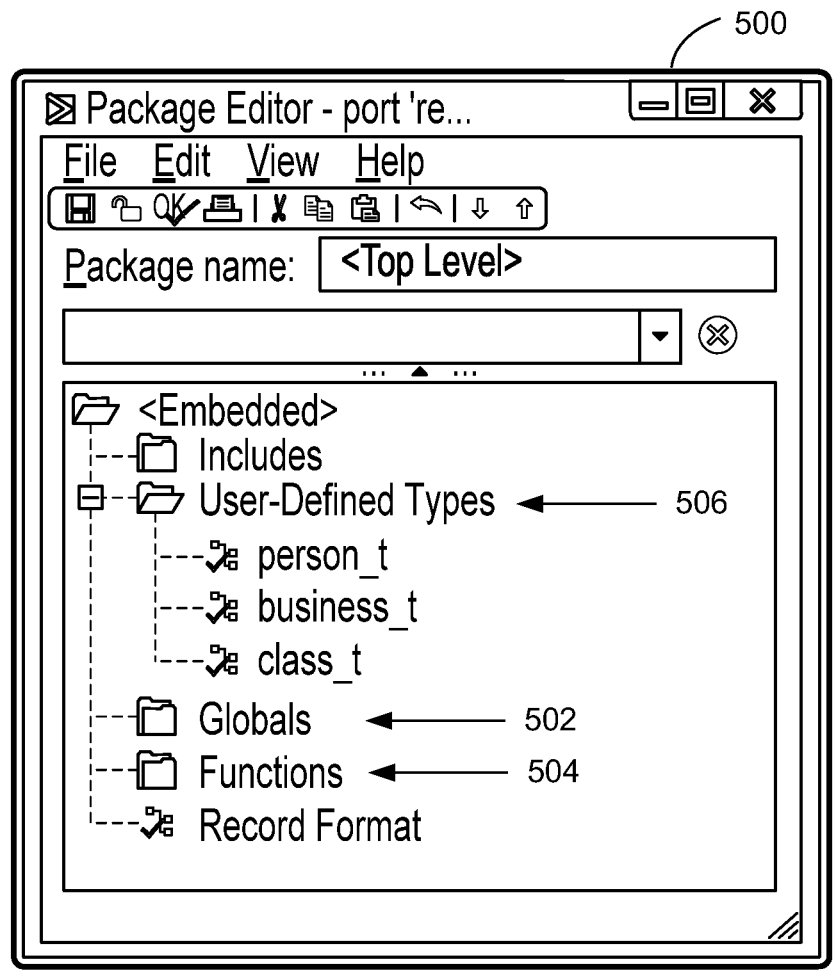

Referring to FIG. 5, once defined, one or more techniques or methodologies may be implemented for storing the named data type structures and retrieving the structures for use. For example, the named data type structures may be expressed in a language such as Data Manipulation Language (DML) and stored in text files (referred to as DML files). Using the named data type structures defined above (e.g., "person_t"), a DML file titled "project.dml" may be stored in a storage device and retrieved for using the defined data type structure. Various techniques may be implemented for accessing and using named data type structures stored in DML files. For example, a file (e.g., another DML file) may include one or more instructions (e.g., an "include" statement, a "package" statement, etc.) that allows one or more other DML files (and the named data type structures defined within the file) to be accessed and used. For example, the contents of a DML file may include the following language:

```
include "project.dml";
type sales_prospects_t =
record
    class_t[integer(4)] educational;
    business_t[integer(4)] commercial;
end;
```

By accessing the DML file ("project.dml") through the use of the "include" statement, the named data type structures (e.g., "business_t") defined within the DML file can be retrieved and used to define a data type structure (e.g., "sales_prospects_t") defined within the file. Such a capability reduces redundancy of data type definitions along with the probability of conflicting data type structures (e.g., data type structures with the same name but different type definitions).

As illustrated in the figure, once defined and stored, named data type structures may be presented for selection and use by a developer. For example, a user interface 500 may include programming attributes for building applications (e.g., global variables 502, functions 504, user-defined types 506, etc.). As presented in the user interface 500, three named data type structures (e.g., "person_t", "business_t" and "class_t") are included in the user-defined types 506 and may be selected for use by a developer. However, similar to the drop down menu 402 presented in FIG. 3, as the list of data type structures grows for various applications, the entries included in the user-defined types 506 may become unwieldy along with redundant entries becoming rampant. Through the growth of frequently used and less frequently used named data type structures, challenges may arise to identify what particular data type structures are available. Redundancy may also become an issue as identifying previously-defined data type structures may become difficult and overly time-consuming for a developer. While the presentation of the user interface 500 provides a listing of each named data type structure, little additional information is provided. For example, lineage of dependency among data type structures, and how the related data types can be grouped, etc. is generally absent from the user interface 500. Further, while the name of the data type structure is present, no information regarding the content of the data type structure is provided from the interface beyond what can be gleamed from the title of each data type structure.

Figure 6:
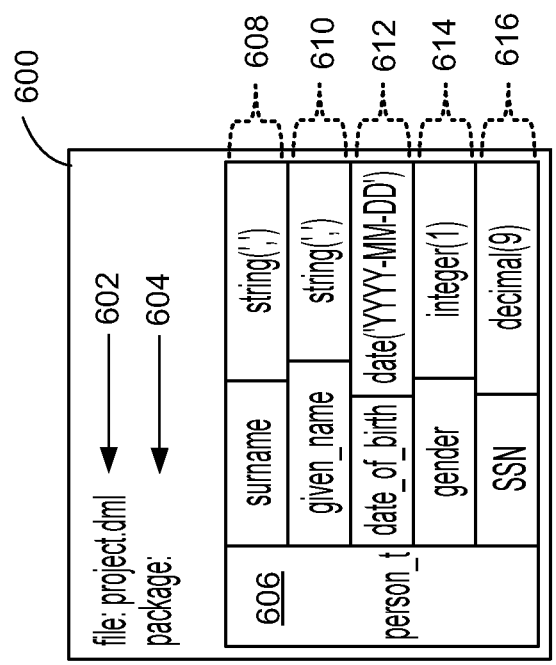

Referring to FIG. 6, a graphical representation 600 is illustrated that represents a named data type structure and the collection of fields that define the structure. Additionally the graphical representation 600 identifies the DML file 602 (e.g. "project.dml") within which the data type structure is defined and stored. A portion of the graphical representation 600 provides an optional name 604 (e.g., DML files) for the file, referred to as a "package", which provides a prefix for the names of the attributes defined in the files, when called external to the file. In this particular example, the package name has been left blank.

In this example, the graphical representation 600 presents the named data type structure "person_t" as being defined as:

```
type person_t =
record
    string(",") surname;
    string(",") given_name;
    date("YYYY-MM-DD") date_of_birth;
    integer(1) gender; // 0 for male, 1 for female
    decimal(9) SSN;
end;
```

In this example, the graphical representation 600 is oriented to be read from the viewer's left to right and initially presents the named data type structure name 606 (e.g., "person_t") on the viewer's left. From the structure defined above, a series of rectangles present the individual fields (e.g., surname 608, given_name 610, date of birth 612, gender 614 and social security number 616) nested into the data type structure "person_t". The graphical representation 600 conveys a hierarchical layout of the named data type structure and its content. Located to the far left side of the graphical representation 600, the name 606 identifies the overall structure while the individual fields 608, 610, 612, 614, 616 are located more to the right and indicate their residing in a lower level in the hierarchy of the data type structure. From this presentation, the viewer is provided an easy-to-read graphical layout of the information associated with the named data type structure. While rectangle shapes are used in this instance to present the information, other shapes and/or collections of difference shapes may be used for presentations. Other graphical features may also be incorporated for assisting a viewer in efficiently ascertaining the named data type structure information. For example, different colors may be implemented, e.g., to quickly alert a viewer to potential issues (e.g., repeated or conflicting fields being defined within a named data type structure). In this instance, static graphics are used for presenting the information; however, graphics that change over time (e.g., animations, video, etc.) may also be used, for example, to quickly grab a viewer's attention. Other graphical representations may also be used, for example, rather than using a left-to-right reading orientation, other layouts and orientations may be implemented for presenting one or more named data structures.

Figure 7:
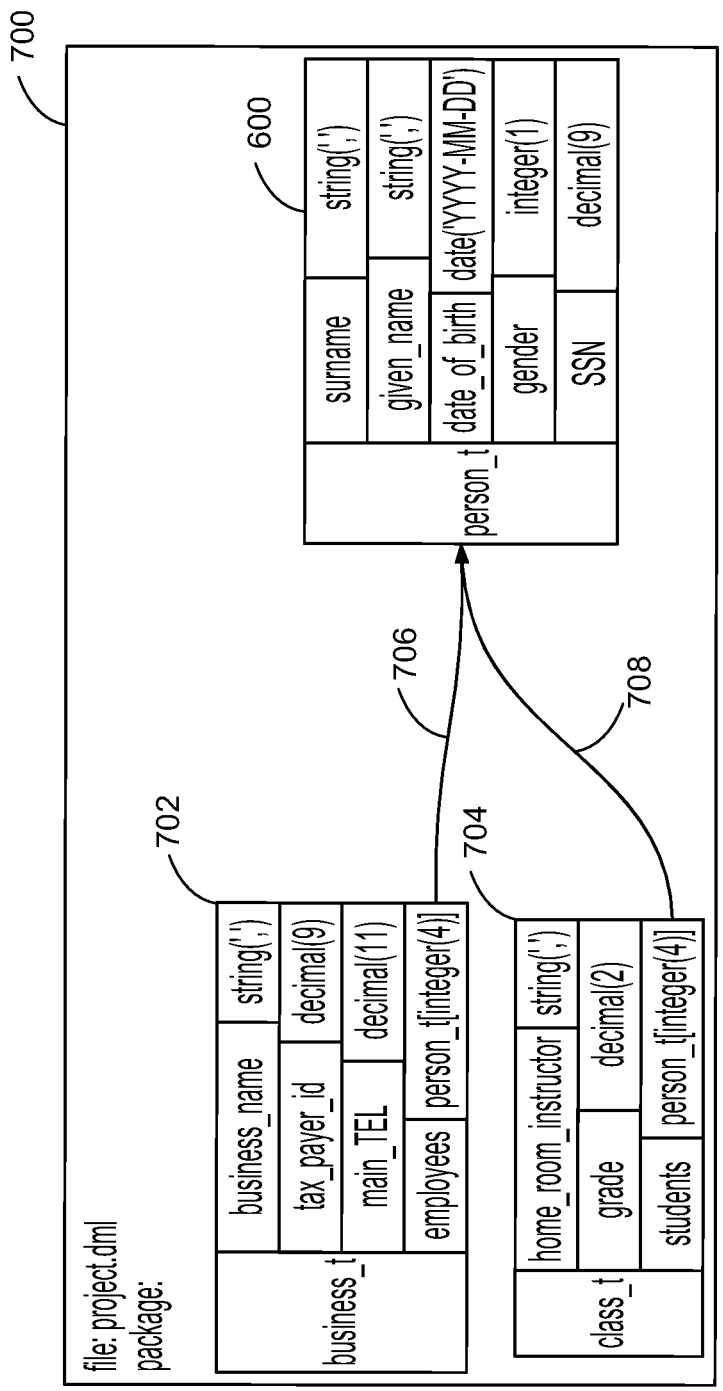
FIGS. 7-12 are user interfaces presenting graphical representations of data type information.

Referring to FIG. 7, a graphical representation 700 illustrates a DML file (e.g., named "project.dml") within which three named data type structures are defined. In particular, along with the graphical representation 600 of the previously defined named data type structure "person_t" (shown in FIG. 6), two additional named data type structures (titled "business_t" and "class_t") are graphically represented in the DML file:

```
type business_t =
record
    string(",") business_name;
    decimal(9) tax_payer_id;
    decimal(11) main_TEL;
    person_t[integer(4)] employees; // here
end
and
type class_t =
record
    string(",") home_room_instructor;
    decimal(2) grade;
    person_t[integer(4)] students; // and here
end;
```

Both the "business_t" named data type structure and the "class_t" named data type structure, illustrated by corresponding graphical representations 702, 704, include fields (e.g., the "employee" field included in the "business_t" named data type structure, and the "student" field included in the "class_t" data type structure) that are defined by the named data type structure "person_t". To graphically illustrate use of the "person_t" named data type structure by the "business_t" and the "person_t" named data type structures, corresponding arrowed lines 706, 708 show the connections between the pairs of named data type structures. From these graphically represented relationships, a viewer (e.g., a developer) can relatively quickly identify the relationships between the named data type structures such as information shared among data type structures, lineage of the use of the previously defined named data type structure (such as "person_t"), etc. Along with providing a layout of the relationships of the named data type structures, the graphical representation 700 visually alerts the viewer to potential adjustment issues. For example, if changes are made to the "person_t" named data type structure, as illustrated by the two arrowed lines 706, 708, both the "business_t" and "class_t" named data type structures would be affected by the changes (e.g., the "employees" field of the "business_t" named data type structure and the "students" field of the "class_t" named data type structure would experience any changes to the "person_t" named data type structure). Similar to presenting the relationship among data type structures, other types of relationships may be graphically presented such as relationships between files.

Figure 8:
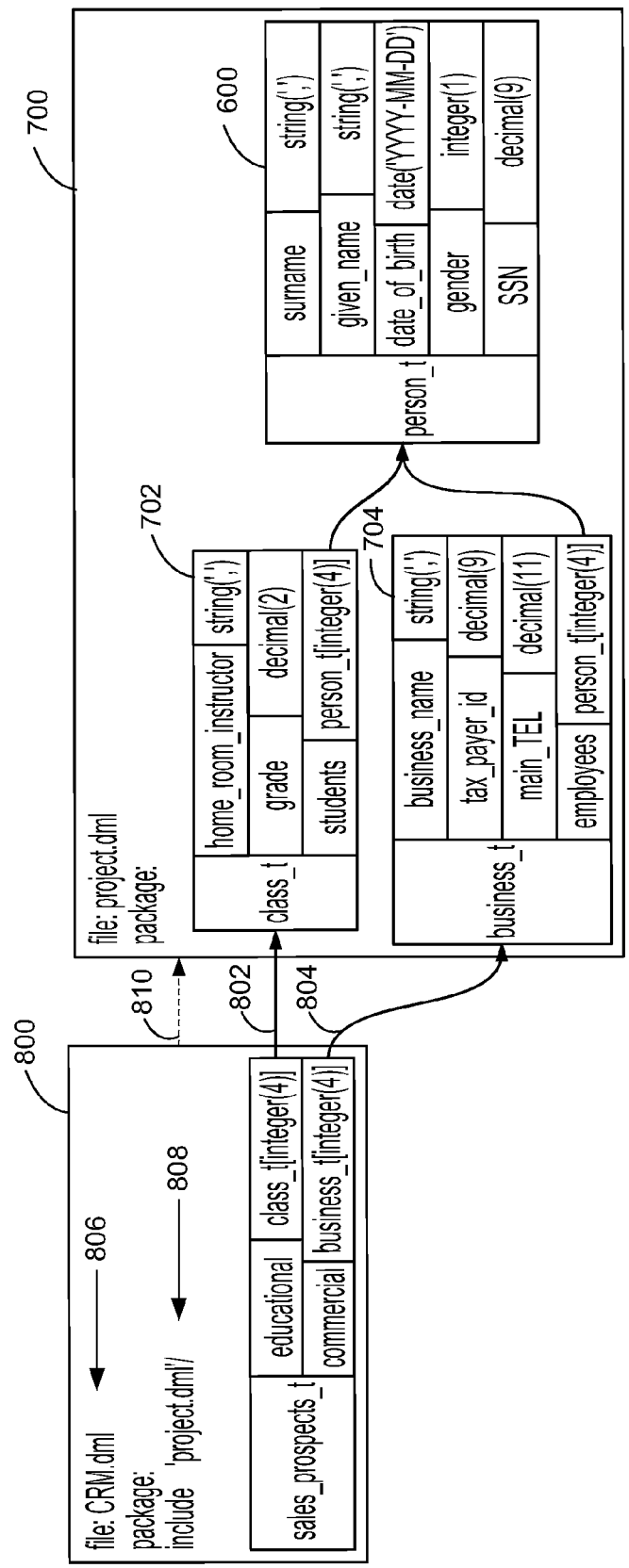

Referring to FIG. 8, two DML files are graphically represented along with their relationships. The graphical representation 700 of the "project.dml" file (shown in FIG. 7) is presented along with the three named data structures defined by the DML file (e.g., the "class_t" named data structure 702, the "business_t" named data structure 704 and the "person_t" named data structure 600). Additionally another DML file titled "CRM.dml" is illustrated with a graphical representation 800 within which a named data type structure (titled "sales_prosects_t") is represented. In this example, two named data type structures are defined by the "CRM.dml" file (e.g., named "educational" and "commercial") and each of the two named date type structures are defined through named data type structures provided by the "project.dml". In particular, the "educational" named data type structure is defined from the "class_t" named data type structure and the "commercial" named data type structure is defined by the "business_t" named data type structure. To represent these two relationships between the "CRM.dml" file and the "project.dml" file, two arrowed lines 802, 804 are illustrated as linking the two graphical representations of the files. Similar to the representations of the named data type structures being linked within a file, similar relationships may be formed through the linking of fields and named type definitions, etc. between two or more files. For example, adjustments made to the definitions of the "class_t" named data type structure 702 or the "business_t" named data type structure 704 (e.g., by changing the "person_t" named data structure 600) in the "project.dml" file can impact the fields (e.g., "educational" and "commercial") and named data type structures (e.g., "sales_prospect_t" named data type structure) in the linked "CRM.dml" file.

Along with presenting graphical representations for the relationships among the fields and named data type structures of the multiple files, the relationship among the files may be graphically represented to the viewer. For example, file level operations may be represented. In this example, for the fields of the CRM.dml file (e.g., "educational" and "commercial") to attain access to the named data type structures in the "project.dml" file, the "project.dml" file needs to be identified by the "CRM.dml" file. For example, an "include" statement may be entered in the "CRM.dml" file to attain access to the "project.dml" file. To graphically represent the identification, along with listing its own file name 806 in the graphical representation 800, the one or more needed files (e.g., the "project.dml") are also represented as needed packages 808. Further, in this example an arrowed, dashed line 810 graphically represents the file-level operation of the "CRM.dml" file of using an "include" statement to attain access to the contents of the "project-.dml" file.

Figure 9:
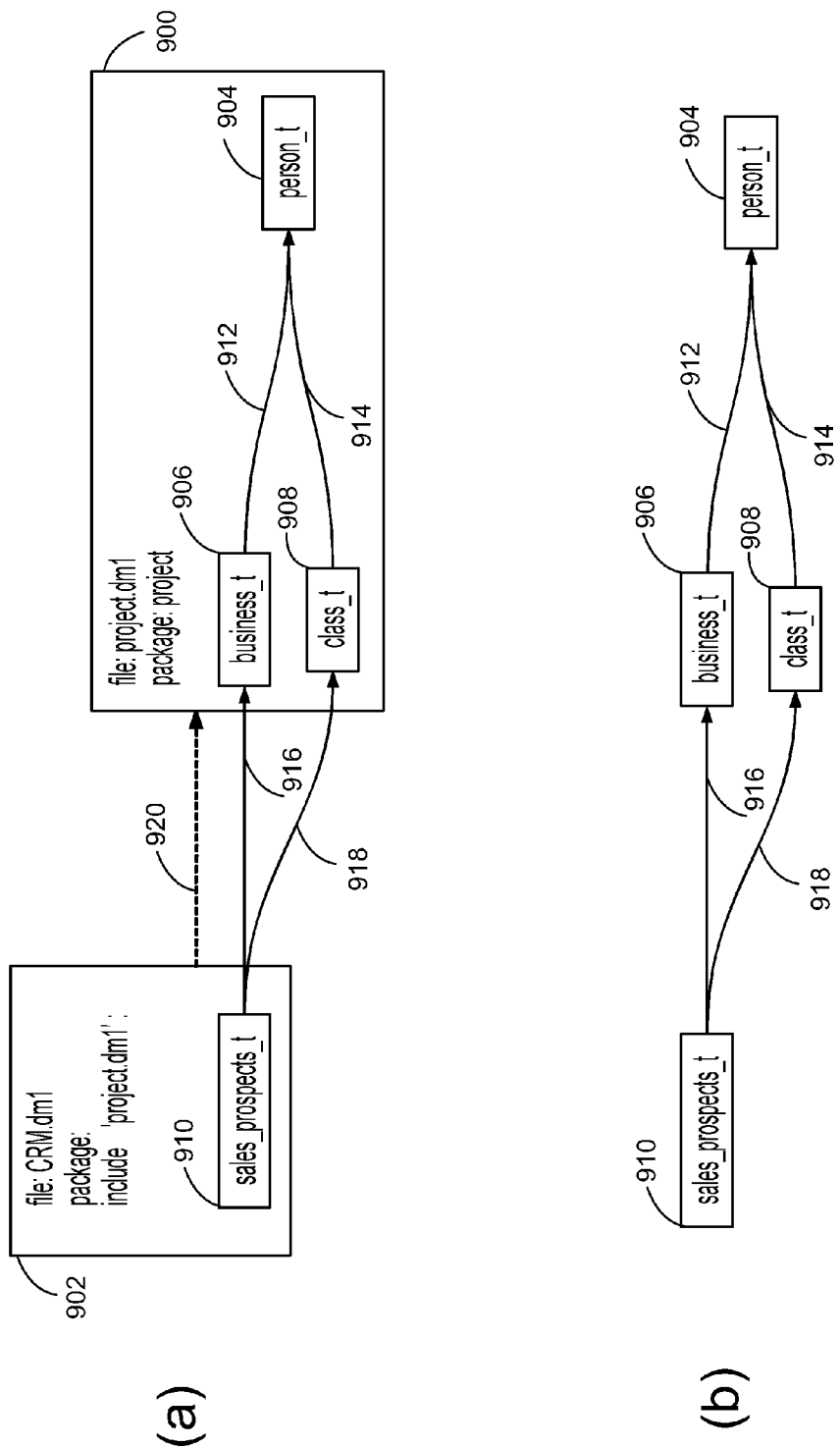

Referring to FIG. 9a, various types of graphical representations may be used to illustrate relationships among files, fields and named data type structures. For example, to reduce the visual complexity of the graphical representations, various amounts of detail may be reduced or removed. In the illustrated example, individual field information is removed from the graphical representations 900, 902 of the two DML files. By removing the information, graphical representations 904, 906, 908, 910 of the data type structures are compacted by simply representing the names of each named data type structure (e.g., "person_t", "business_t", "class_t" and "sales_prospects_t"). Along with reducing the amount of visual business of the graphical representations, real estate is conserved for other information such as the arrowed lines 912, 914 that represent relationships between named data type structures within a file, and arrowed lines 916, 918 that represent relations between named data type structures that reside in different files. Similarly, the conserved real estate may assist the viewer in quickly recognizing other relationships, e.g., files identifying other files with an arrowed dashed line 920 to indicate the use of an "include" statement to provide file access. Along with providing the viewer (e.g., a developer) with a compacted view of named data type structures and their relationships, other functionality may be provided by the graphical representations. For example, manipulating fields, named data type structures and related information may be more efficiently executed by using the graphical representations.

Referring to FIG. 9b, graphical representations may be adjusted and manipulated to efficiently construct, reconstruct, etc. the files data type structures, files, etc. For example, representations of data structures may be grouped differently to define new files. As illustrated, the graphical representations of files (e.g., DML file representations 900 and 902) have been removed allowing a developer to adjust the grouping of the graphical representations of the data type structures 904, 906, 908, 910. Along with allowing the data type structures to be reorganized for storage in same or different file or files, such manipulations may improve relationships among the files and reduce the occurrence of unnecessary "include" statements. Just to demonstrate with the illustrated example, the graphical representation 906 (for the data type structure "business_t") may be grouped with the graphical representation 910 (for the data type structure "sales_prospects_t") for more efficient operation. Once grouped, the graphical representations may be initiate file creation for storing the newly grouped data type structures. Along using such operations for grouping and manipulating data type structures, file level operations may also be performed. For example, graphical representations of files (e.g., representations 900, 902) may be manipulated for combining, removing, appending, etc. the content (e.g., data type structures) of the files.

Figure 10:
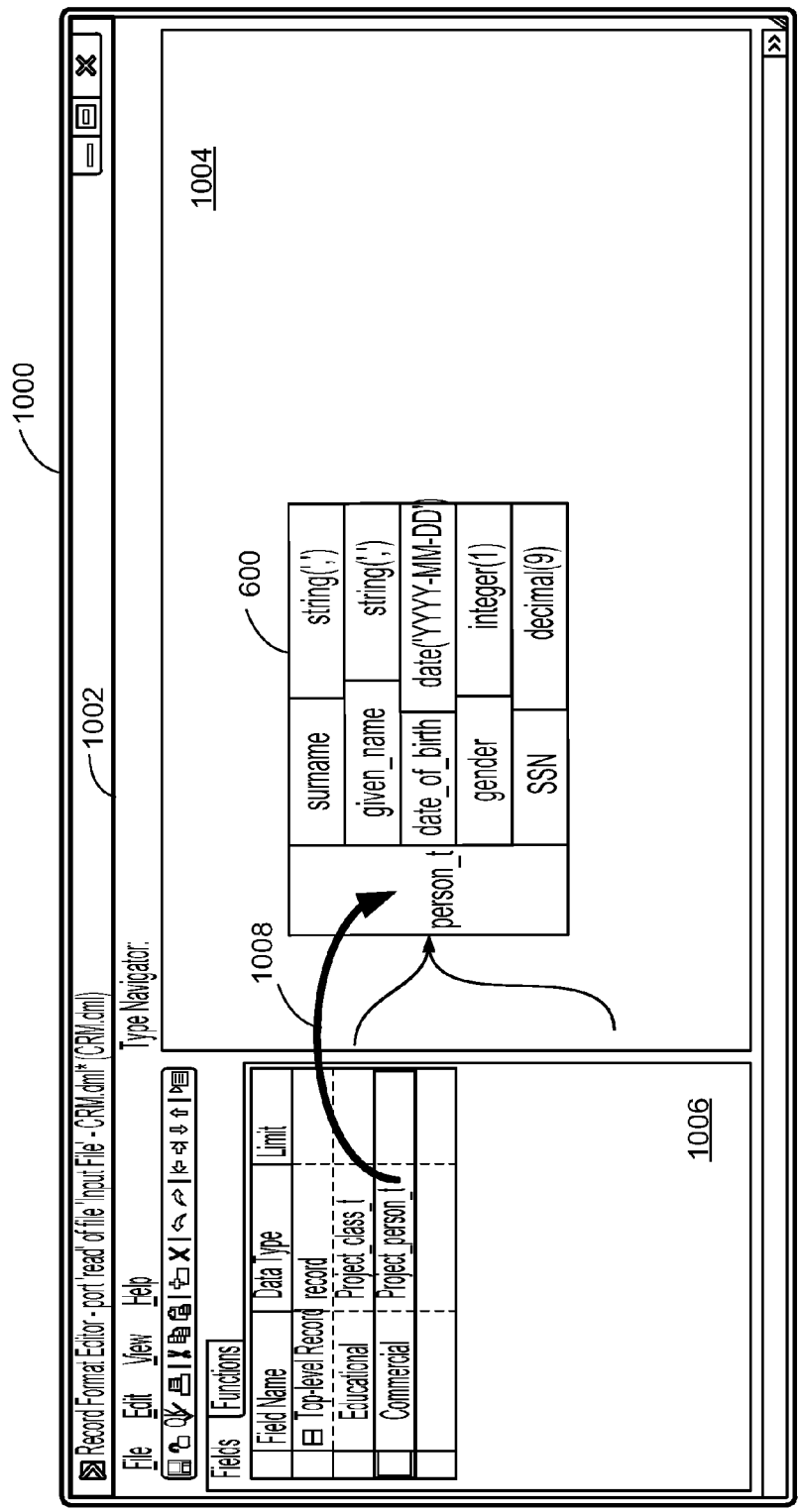

Referring to FIG. 10, a user interface 1000 is illustrated that provides an editor 1002 for manipulating graphical representations of fields, named data type structures and other types of programming attributes. The editor 1002 includes a window 1004 that presents the graphical representations of the fields, named data type structures and related information (e.g., arrowed lines to represent data type relationships). The editor 1002 also includes a palette 1006 that allows a user (e.g., a developer) to select from a variety of fields, named data type structures, etc. for inclusion in the applications being developed. For example, as represented in the figure by bold, arrowed line 1008, a pointing device may be used to select and insert (e.g., drag and drop) a named data type structure into the window 1004 for project development. Similarly, the selection and insertion operation may be reversed such that a named data type structure is selected from the window 1004 (after being developed) and inserted into the palette 1006. Selection and insertion operations may also be executed solely within the window 1004 or the palette 1006. For example, operations (e.g., drag and drop operations) may be executed in the palette 1006 to create, edit, etc. one or more fields, named data type structures, etc. Similarly, operations (e.g., select, insert, delete, append, etc.) may be initiated by a user in the window 1004 for adjusting fields, named data type structures, etc. Other types of manipulation operations may also be executed, for example, relationships between fields, named data type structures, files (e.g., DML files), etc. may be graphically manipulated.

Figure 11:
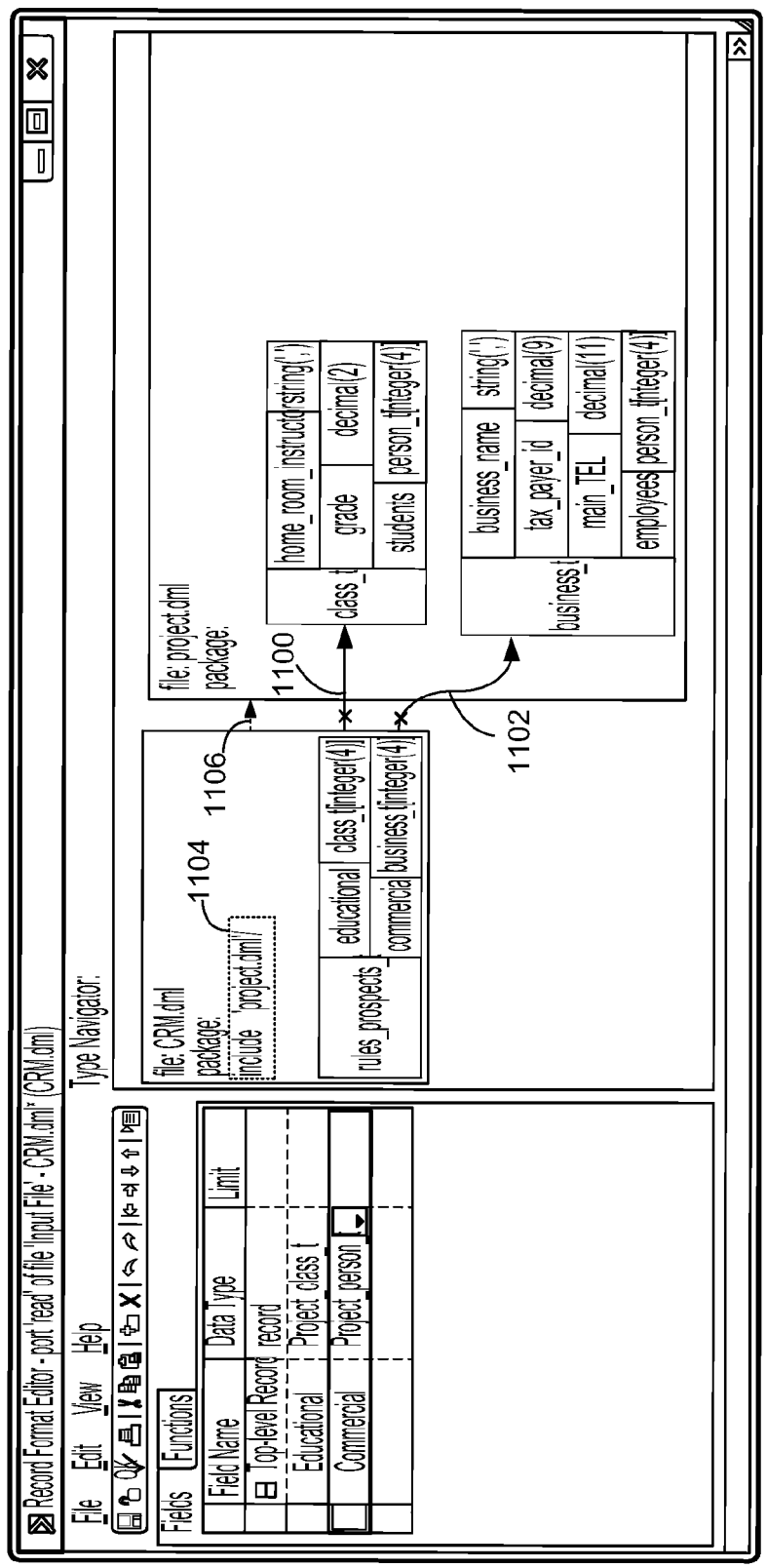

Referring to FIG. 11, operations for manipulating fields, named data type structures, files, etc. and relationships may be graphically initiated by a user (e.g., a developer). For example, arrowed lines may be manipulated (e.g., deleted, added, moved, etc.) for adjusting relationships among fields and named data type structures. In this illustrated example, two lines 1100 and 1102 are deleted (as represented by graphical symbol "x" being respectively positioned on each line through a user's pointing device). Based upon the relationship being severed between the "project.dml" file and the "CRM.dml" file due to deleting the lines, the "CRM.dml" no longer needs access to the contents of the "project.dml" file. As such, the instruction within the "CRM.dml" file for accessing the "project.dml" file (e.g., "include 'project.dml'") is removed from the "CRM.dml" file (as represented by the dashed-line box 1104). Correspondingly, the dashed line 1106 that represents this relationship between the "CRM.dml" file and the "project.dml" file may be similarly removed from the graphical representations of the files. Alternatively, when such relationships between files are established or re-established (e.g., by connecting the two files with lines 1100 and 1102), the instruction (e.g., "include 'project.dml'") may be inserted or re-inserted into the appropriate file (e.g., "CRM.dml") and a graphical representation (e.g., the dashed line 1106) may again be presented to illustrate the relationship.

Figure 12:
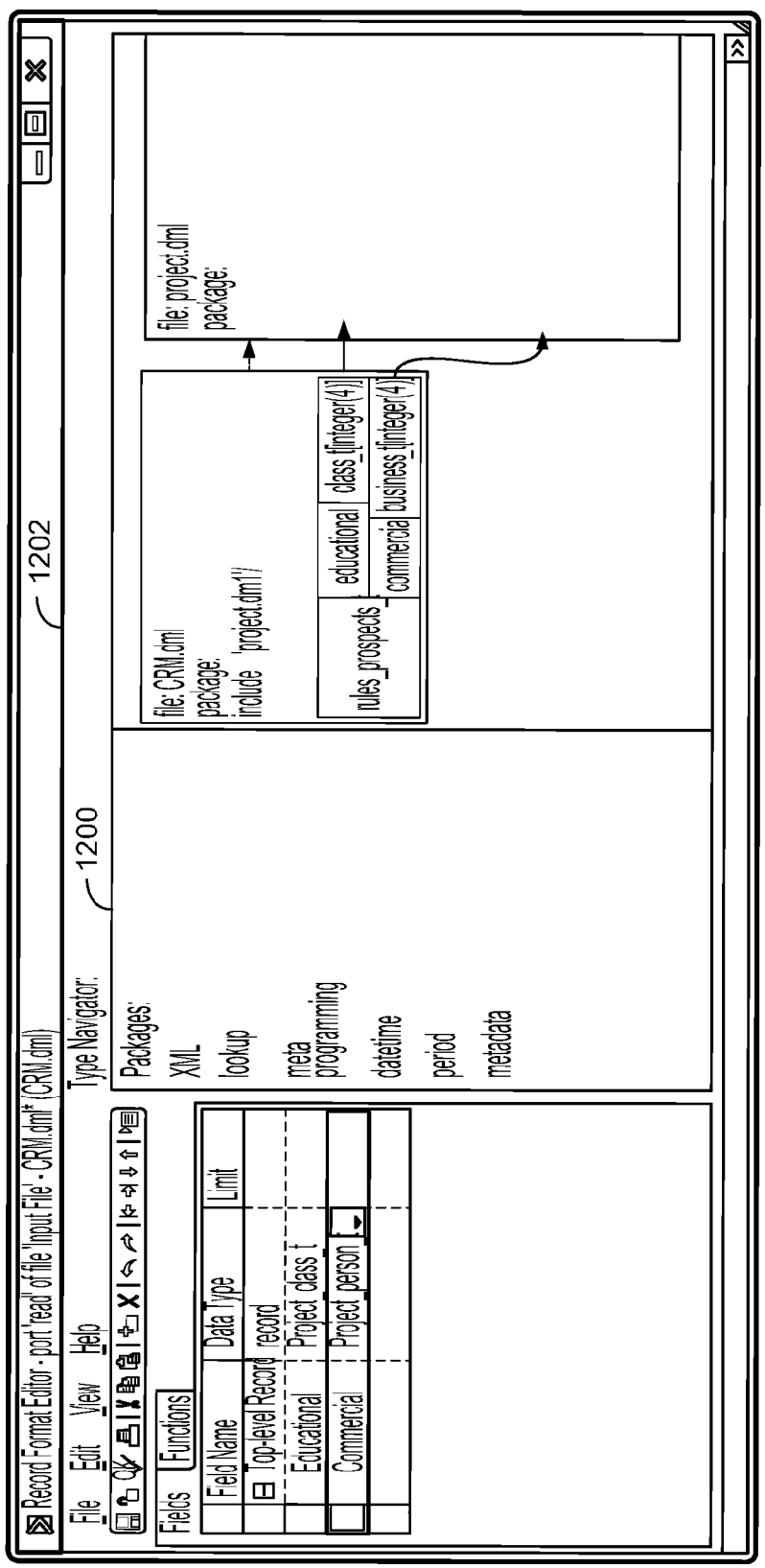

Referring to FIG. 12, as the amount of named fields, named data type structures, files, etc. grow, one or more techniques may be implemented to assist the user (e.g., the developer) to navigate among the potential fields, named data type structures, files, etc. that may be selected for use during application development. For example, one or more graphical representations may present a selectable list of files that include useable fields and named data type structures. In some arrangements, hierarchical listings may be used to assist the user in navigating the files, named data type structures, etc. As illustrated in the figure, a pane 1200 is included in a user interface 1202 that allows the user to navigate among a listing of different packages (e.g., XML processing data types, lookup data types, meta programming data types, date/time data types, metadata types, etc.). In one arrangement, once a selection is made, artifacts defined in the selected package, such as named data type structures and functions may be displayed in a graphical representation located on the right-hand side of the user interface 1202 and manipulated (e.g., selected, navigated, dragged-and-dropped onto the pane 1200) as needed.

Along with organizing, manipulating, etc. fields, named data type structures, files for application development, other types of programming attributes may similarly be graphically represented for assisting developers. For example, functions, variables, etc. used by applications may similarly become unwieldy as more and more such programming attributes are created and stored in libraries for later retrieval and reuse. Other techniques may also be implemented for assisting developers in identifying and selecting appropriate programming attributes. For example, algorithms for logically distributing programming attributes among files (referred to as clustering algorithms) may be used, for example, to organize fields, named data type structures, functions, etc. Through such organizing techniques the amount of instructions (e.g., "include" statements) may be reduced along with redundant use of named data type structures.

Figure 13:
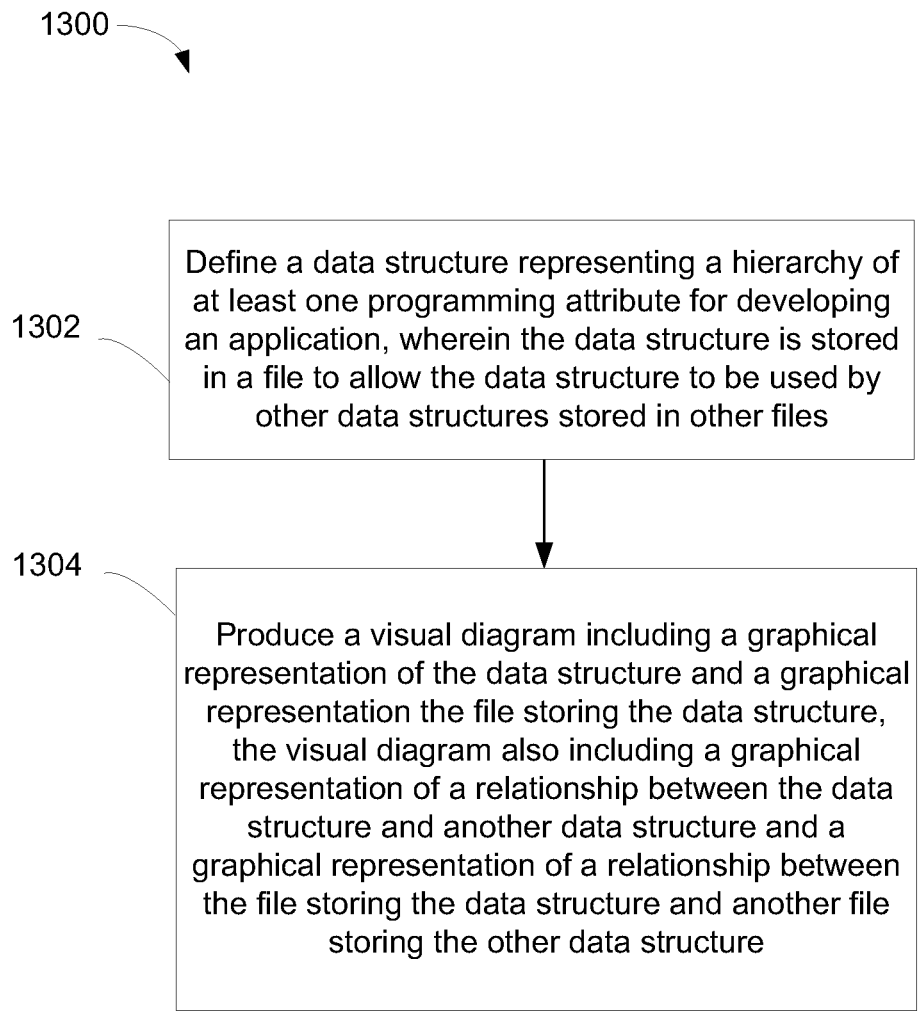
FIG. 13 is a flowchart of an exemplary programming attribute presentation procedure.

Referring to FIG. 13, a flowchart 1300 represents operations of a procedure for graphically representing programming attributes such as named data type structures used in application development. The operations are typically executed by a single computing device (e.g., providing a development environment); however, operations may be executed by multiple computing devices. Along with being executed at a single site, operation execution may be distributed among two or more locations.

Operations may include defining 1302 a data structure representing a hierarchy of one or more programming attributes for developing an application. The graphical representation of the files are removable to allow for manipulating the graphical representations of the data structure to define one or more data structure groups and to create one or more new files for storing the one or more data structure groups. For example, a hierarchy of subrecords, records, fields, named data type structures, etc. may be used to define a data structure. The data structure is defined to be included in a single file (for storage), but in some arrangements the data structure may be included in multiple files (e.g., for storing and later retrieval). Operations also include producing 1304 a visual diagram including a graphical representation of the data structure and a graphical representation the file storing the data structure. The visual diagram also includes a graphical representation of a relationship between the data structure and another data structure and a graphical representation of a relationship between the file storing the data structure and another file storing the other data structure. For example, as shown in FIG. 7, two named data type structures (e.g., "business_t" and "class_t") are graphically represented in a visual diagram that represents the named data type structures included in a file "project.dml". A third data type structure is also presented (e.g., "person_t") that includes a hierarchy of fields that are used by both of the other named data type structures (e.g., "business_t" and "class_t") as indicated by the graphical lines 706, 708 also represented in the visual diagram. Along with illustrating the contents of each data structure, relationships among the data structures are graphically represented, for example, to allow a viewer (e.g., a developer) to relatively quickly ascertain the lineage of fields, named data type structures, etc. and their relationships.

The approach for graphically representing computational artifact described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for representing information, including:
defining a first data structure representing a hierarchy of at least one programming attribute for developing an application, wherein the first data structure is stored in a first file to allow the first data structure to be used by other data structures stored in other files, wherein the first data structure is defined based on a definition for a second data structure that is stored in a second file;
producing a visual diagram including a graphical representation of each of the first data structure, the second data structure, the first file, and the second file, wherein the graphical representation of each data structure includes a representation of an identifier of the data structure and a representation of each of one or more fields of the data structure and wherein the graphical representation of each file includes a representation of an identifier of the file,
the visual diagram also including:
a first graphical feature connecting the graphical representation of the first data structure with the graphical representation of the second data structure, the first graphical feature indicative that the first data structure is defined based on the definition for the second data structure, and
a second graphical feature connecting the graphical representation of the first file with the graphical representation of the second file, the second graphical feature indicative that the first data structure stored in the first file is defined based on the definition for the second data structure stored in the second file,
wherein, in the visual diagram, the graphical representation of the first data structure is located within a region of the visual diagram that is contained within an outer boundary of the graphical representation of the first file and the graphical representation of the second data structure is located within a region of the visual diagram that is contained within an outer boundary of the graphical representation of the second file; and
causing display of the visual diagram on a user interface.

2. The method of claim 1, wherein the graphical representation of the first and second files are removable to allow for manipulating the graphical representations of the first and second data structures to define one or more data structure groups and to create one or more new files for storing the one or more data structure groups.

3. The method of claim 1 further including:
enabling manipulation of the defined first data structure to adjust the at least one programming attribute.

4. The method of claim 1 further including:
enabling manipulation of the defined first data structure for inserting the at least one programming attribute into a file.

5. The method of claim 4 wherein a statement is inserted with the at least one programming attribute into the file.

6. The method of claim 4 wherein manipulation of the data structure includes a drag and drop operation.

7. The method of claim 3, wherein manipulation of the defined first data structure includes at least one of adding, deleting and editing content of the hierarchy of the programming attribute.

8. The method of claim 1, wherein the programming attribute is a named data type.

9. The method of claim 1, wherein the programming attribute is a function.

10. The method of claim 1, wherein the relationship between the first data structure and the second data structure represents lineage of the programming attribute.

11. A non-transitory computer-readable storage medium storing a computer program for representing information, the computer program including instructions for causing a computing system to:
define a first data structure representing a hierarchy of at least one programming attribute for developing an application, wherein the first data structure is stored in a first file to allow the first data structure to be used by other data structures stored in other files, wherein the first data structure is defined based on a definition for a second data structure that is stored in a second file;
produce a visual diagram including a graphical representation of each of the first data structure, the second data structure, the first file, and the second file, wherein the graphical representation of each data structure includes a representation of an identifier of the data structure and a representation of each of one or more fields of the data structure and wherein the graphical representation of each file includes a representation of an identifier of the file, the visual diagram also including:
a first graphical feature connecting the graphical representation of the first data structure with the graphical representation of the second data structure, the first graphical feature indicative that the first data structure is defined based on the definition for the second data structure, and
a second graphical feature connecting the graphical representation of the first file with the graphical representation of the second file, the second graphical feature indicative that the first data structure stored in the first file is defined based on the definition for the second data structure stored in the second file,
wherein, in the visual diagram, the graphical representation of the first data structure is located within a region of the visual diagram that is contained within an outer boundary of the graphical representation of the first file and the graphical representation of the second data structure is located within a region of the visual diagram that is contained within an outer boundary of the graphical representation of the second file; and
cause display of the visual diagram on a user interface.

12. A computing system for representing information, the computing system including:
at least one processor configured to process information, the processing including
defining a first data structure representing a hierarchy of at least one programming attribute for developing an application, wherein the first data structure is stored in a first file to allow the first data structure to be used by other data structures stored in other files, wherein the first data structure is defined based on a definition for a second data structure that is stored in a second file,
producing a visual diagram including a graphical representation of the each of the first data structure, the second data structure, the first file, and the second file, wherein the graphical representation of each data structure includes a representation of an identifier of the data structure and a representation of each of one or more fields of the data structure and wherein the graphical representation of each file includes a representation of an identifier of the file, the visual diagram also including:
a first graphical feature connecting the graphical representation of the first data structure with the graphical representation of the second data structure, the first graphical feature indicative that the first data structure is defined based on the definition for the second data structure, and
a second graphical feature connecting the graphical representation of the first file with the graphical representation of the second file, the second graphical feature indicative that the first data structure stored in the first file is defined based on the definition for the second data structure stored in the second file,
wherein, in the visual diagram, the graphical representation of the first data structure is located within a region of the visual diagram that is contained within an outer boundary of the graphical representation of the first file and the graphical representation of the second data structure is located within a region of the visual diagram that is contained within an outer boundary of the graphical representation of the second file; and
an output device for presenting, on a user interface, the visual diagram that includes the graphical representation of each of the first data structure, the second data structure, the first file, and the second file, the first graphical feature connecting the graphical representation of the first data structure and the graphical representation of the second data structure, and the second graphical feature connecting the graphical representation of the first file and the graphical representation of the second file.

13. A computing system for representing information, the computing system including:
means for processing including
defining a first data structure representing a hierarchy of at least one programming attribute for developing an application, wherein the first data structure is stored in a first file to allow the first data structure to be used by other data structures stored in other files, wherein the first data structure is defined based on a definition for a second data structure that is stored in a second file,
producing a visual diagram including a graphical representation of each of the first data structure, the second data structure, the first file, and the second file, wherein the graphical representation of each data structure includes a representation of an identifier of the data structure and a representation of each of one or more fields of the data structure and wherein the graphical representation of each file includes a representation of an identifier of the file, the visual diagram also including:
  a first graphical feature connecting the graphical representation of the first data structure with the graphical representation of the second data structure, the first graphical feature indicative that the first data structure is defined based on the definition for the second data structure,
  a second graphical feature connecting the graphical representation of the first file with the graphical representation of the second file, the second graphical feature indicative that the first data structure stored in the first file is defined based on the definition for the second data structure stored in the second file,
  wherein, in the visual diagram, the graphical representation of the first data structure is located within a region of the visual diagram that is contained within an outer boundary of the graphical representation of the first file and the graphical representation of the second data structure is located within a region of the visual diagram that is contained within an outer boundary of the graphical representation of the second file; and
means for presenting, on a user interface, the visual diagram that includes the graphical representation of each of the first data structure, the second data structure, the first file, and the second file, the first graphical feature connecting the graphical representation of the first data structure and the graphical representation of the second data structure, and the second graphical feature connecting the graphical representation of the first file and the graphical representation of the second file.

14. The non-transitory computer-readable storage medium of claim 11, wherein the graphical representation of the first and second files are removable to allow for manipulating the graphical representations of the first and second data structures to define one or more data structure groups and to create one or more new files for storing the one or more data structure groups.

15. The non-transitory computer-readable storage medium of claim 11, the computer program including instructions for causing the computing system to:
  enable manipulation of the defined first data structure to adjust the at least one programming attribute.

16. The non-transitory computer-readable storage medium of claim 11, the computer program including instructions for causing the computing system to:
  enable manipulation of the defined first data structure for inserting the at least one programming attribute into a file.

17. The non-transitory computer-readable storage medium of claim 11, wherein the relationship between the first data structure and the second data structure represents lineage of the programming attribute.

18. The non-transitory computer-readable storage medium of claim 11, wherein the first graphical feature indicative of a relationship between the first data structure and the second data structure comprises a first graphical feature connecting the graphical representation of the first data structure and the graphical representation of the second data structure, and
  wherein the second graphical feature indicative of a relationship between the first file and the second file comprises a second graphical feature connecting the graphical representation of the first file and the graphical representation of the second file.

19. The computing system of claim 12, wherein the graphical representation of the first and second files are removable to allow for manipulating the graphical representations of the first and second data structures to define one or more data structure groups and to create one or more new files for storing the one or more data structure groups.

20. The computing system of claim 12, the processing including:
  enabling manipulation of the defined first data structure to adjust the at least one programming attribute.

21. The computing system of claim 12, the processing including:
  enabling manipulation of the defined first data structure for inserting the at least one programming attribute into a file.

22. The computing system of claim 12, wherein the relationship between the first data structure and the second data structure represents lineage of the programming attribute.

23. The computing system of claim 12, wherein the first graphical feature indicative of a relationship between the first data structure and the second data structure comprises a first graphical feature connecting the graphical representation of the first data structure and the graphical representation of the second data structure, and
  wherein the second graphical feature indicative of a relationship between the first file and the second file comprises a second graphical feature connecting the graphical representation of the first file and the graphical representation of the second file.

24. The computing system of claim 13, wherein the graphical representation of the first and second files are removable to allow for manipulating the graphical representations of the first and second data structures to define one or more data structure groups and to create one or more new files for storing the one or more data structure groups.

25. The computing system of claim 13, including means for enabling manipulation of the defined first data structure to adjust the at least one programming attribute.

26. The computing system of claim 13, including means for enabling manipulation of the defined first data structure for inserting the at least one programming attribute into a file.

27. The computing system of claim 13, wherein the relationship between the first data structure and the second data structure represents lineage of the programming attribute.

28. The computing system of claim 13, wherein the first graphical feature indicative of a relationship between the first data structure and the second data structure comprises a first graphical feature connecting the graphical representation of the first data structure and the graphical representation of the second data structure, and
  wherein the second graphical feature indicative of a relationship between the first file and the second file comprises a second graphical feature connecting the graphical representation of the first file and the graphical representation of the second file.

29. The method of claim 1, wherein the graphical representation of each data structure comprises a table, wherein the representation of each of the one or more fields of the data structure is included in the table.

30. The method of claim 1, wherein the graphical representation of each data structure comprises a representation of a data type for each of the fields of the data structure.

31. The method of claim 1, wherein the first graphical feature comprises an arrow from the graphical representation of the first data structure to the graphical representation of the second data structure.

32. The method of claim 1, wherein the graphical representations of the first file includes a first polygon and the graphical representation of the second file includes a second polygon.

33. The method of claim 32, wherein the graphical representation of the first data structure is contained within an interior of the first polygon and the graphical representation of the second data structure is contained within an interior of the second polygon.

\* \* \* \* \*